(12) United States Patent
Pinkerton

(10) Patent No.: US 10,194,244 B2
(45) Date of Patent: Jan. 29, 2019

(54) ELECTRICALLY CONDUCTIVE MEMBRANE PUMP SYSTEM

(71) Applicant: CLEAN ENERGY LABS, LLC, Austin, TX (US)

(72) Inventor: Joseph F. Pinkerton, Austin, TX (US)

(73) Assignee: Clean Energy Labs, LLC, Austin, TX (US)

( * ) Notice: Subject to any disclaimer, the term of this patent is extended or adjusted under 35 U.S.C. 154(b) by 334 days.

(21) Appl. No.: 15/193,405

(22) Filed: Jun. 27, 2016

(65) Prior Publication Data

US 2016/0309259 A1    Oct. 20, 2016

Related U.S. Application Data

(63) Continuation-in-part of application No. 13/801,464, filed on Mar. 13, 2013, now abandoned, which is a
(Continued)

(51) Int. Cl.
    *H04R 7/02*      (2006.01)
    *H04R 1/10*      (2006.01)
    (Continued)

(52) U.S. Cl.
    CPC .............. *H04R 7/02* (2013.01); *F02B 23/02* (2013.01); *F02B 23/08* (2013.01); *F02B 75/36* (2013.01); *F02P 13/00* (2013.01); *F02P 15/06* (2013.01); *F04B 43/043* (2013.01); *F16K 99/0015* (2013.01); *F16K 99/0051* (2013.01); *H04B 11/00* (2013.01); *H04R 1/1016* (2013.01);
    (Continued)

(58) Field of Classification Search
    CPC .... H04R 7/02; H04R 1/1016; H04R 2420/07; H04R 2307/023; F04B 43/043; F02B 75/36; F02B 23/02; F02B 23/08; F02P 13/00; F02P 15/06; H04B 11/00; F16K 99/0015; F16K 99/0051; F16K 2099/0094; F16K 2099/0096
    See application file for complete search history.

(56) References Cited

U.S. PATENT DOCUMENTS 2,846,520 A   8/1958   Brownscombe
4,344,743 A   8/1982   Bessman et al.
(Continued)

FOREIGN PATENT DOCUMENTS

WO   2011/097390 A1   8/2011
WO   2012166231 A1    12/2012

OTHER PUBLICATIONS

Kenney, The Best Bluetooth Wireless Headphones to Pair with Your Smartwatch, Aug. 28, 2015, pp. 1-7. (Year: 2015).*
(Continued)

*Primary Examiner* — Daniel Pihulic
(74) *Attorney, Agent, or Firm* — Dickinson Wright PLLC; Ross Spencer Garsson

(57) ABSTRACT

Pump systems having electrically conductive membranes are described. In embodiments of the invention, the electrically conductive membranes can be utilized as speakers to produce ultrasonic and audible sounds. The electrically conductive membranes are made from materials such as graphene, graphene oxide, and polymer films having a thin conductive coating.

25 Claims, 11 Drawing Sheets

Related U.S. Application Data continuation of application No. 13/577,422, filed as application No. PCT/US2011/023618 on Feb. 3, 2011, now abandoned.

(60) Provisional application No. 61/301,209, filed on Feb. 4, 2010.

(51) Int. Cl.
| | |
|---|---|
| *F04B 45/047* | (2006.01) |
| *F04B 45/04* | (2006.01) |
| *F04B 53/10* | (2006.01) |
| *F02B 23/02* | (2006.01) |
| *F02B 75/36* | (2006.01) |
| *F02B 23/08* | (2006.01) |
| *F02P 15/06* | (2006.01) |
| *F02P 13/00* | (2006.01) |
| *H04B 11/00* | (2006.01) |
| *F04B 43/04* | (2006.01) |
| *F16K 99/00* | (2006.01) |

(52) U.S. Cl.
CPC ........... *F16K 2099/0094* (2013.01); *F16K 2099/0096* (2013.01); *H04R 2307/023* (2013.01); *H04R 2420/07* (2013.01)

(56) References Cited

U.S. PATENT DOCUMENTS

| | | | |
|---|---|---|---|
| 5,529,465 A | 6/1996 | Zengerle | |
| 5,748,758 A | 5/1998 | Menasco et al. | |
| 7,505,110 B2 | 3/2009 | Furukawa et al. | |
| 7,632,482 B1 | 12/2009 | Insepov | |
| 7,995,777 B2 | 8/2011 | Yu et al. | |
| 9,516,426 B2 * | 12/2016 | Pinkerton | H04R 7/02 |
| 2003/0231967 A1 | 12/2003 | Najafi et al. | |
| 2004/0000843 A1 | 1/2004 | East | |
| 2004/0125958 A1 * | 7/2004 | Brewster | H04K 1/00 380/270 |
| 2007/0215224 A1 | 9/2007 | Furukawa et al. | |
| 2008/0116764 A1 | 5/2008 | Heim | |
| 2008/0245985 A1 | 10/2008 | Heim | |
| 2008/0248275 A1 | 10/2008 | Jang | |
| 2009/0074228 A1 | 3/2009 | Mango et al. | |
| 2010/0183180 A1 | 7/2010 | Tsai | |
| 2012/0000293 A1 | 1/2012 | Baughman et al. | |
| 2015/0381782 A1 * | 12/2015 | Park | H04M 9/08 381/100 |
| 2016/0007124 A1 * | 1/2016 | Pinkerton | H04R 19/02 381/191 |
| 2016/0309259 A1 * | 10/2016 | Pinkerton | H04R 7/02 |

OTHER PUBLICATIONS

Patent Cooperation Treaty; PCT International Search Report, Issued in Connection with PCT/US11/23618; dated Apr. 22, 2011; 3 pages; USA.

Patent Cooperation Treaty; PCT Written Opinion of the International Searching Authority, Issued in Connection with PCT/US11/23618; dated Apr. 22, 2011; 8 pages; USA.

J. Scott Bunch et al., "Impermeable Atomic Membranes from Graphene Sheets," Nano Letters; Jul. 17, 2008; pp. 2458-2462; USA.

Debdeep Jena et al., "Zener Tunneling in Semiconducting Nanotube and Graphene Nanoribbon p-n Junctions." Applied Physics Letters; Sep. 18, 2008; 3 pages; USA.

Chobint (http://www.headfi.org/t/441341/the-future-of-electrostalic-speakers-graphene, published Aug. 22, 2009).

Popular Science (How to choose the right speaker, https://books.google.com/books?id=XyEDAAAAMBAJ&pg=RA3-PA196&lpg=RA3-PA196&dg=is+a+loudsgeaker+a+pump&source=bl&ots=YtXV-Vyh-c&siq=Lbqd9rY6hFAGnXklbla453MxU1l&hl=en&sa=X&ei=VcmOVdGMBoKZoQTmgZOYBw&ved=OCDEQ6AEwBg#v=onepage&q=is%20a%20loudspeaker%20a%20pump&f=false, Feb. 1957).

International Search Report and Written Opinion, PCT/US2014/025981, dated July 7, 2014, 10 pages.

C. Lee et al; Measurement of the Elastic Properties and Intrinsic Strength of Monolayer Graphene, Science, vol. 321, No. 5887, July 18, 2008, pp. 385-388.

\* cited by examiner

ELECTRICALLY CONDUCTIVE MEMBRANE PUMP SYSTEM

CROSS-REFERENCE TO RELATED PATENT APPLICATIONS

This application is a continuation-in-part of U.S. patent application Ser. No. 13/801,464, filed Mar. 13, 3013 ("the '464 application"), which is a continuation of U.S. patent application Ser. No. 13/577,422, to Pinkerton, filed Aug. 6, 2012, which is the 35 U.S.C. § 371 national application of International Patent Application No. PCT/US11/23618, filed Feb. 3, 2011, which designated the United States and claimed priority to provisional U.S. Patent Application Ser. No. 61/301,209, filed on Feb. 4, 2010.

This application is also related to U.S. patent application Ser. No. 13/802,151, filed Aug. 1, 2013, (now issued as U.S. Pat. No. 9,353,740), and which is a continuation-in-part of the '464 Application.

All of these patents/patent applications are entitled "Graphene-Drum Pump and Engine Systems," are each commonly assigned to the Assignee of the present invention, and are hereby incorporated herein by reference in its entirety for all purposes.

TECHNICAL FIELD

The present invention relates to pump systems having electrically conductive membrane.

SUMMARY OF THE INVENTION

Graphene membranes (also otherwise referred to as "graphene drums") have been manufactured using process such as disclosed in Lee et al. Science, 2008, 321, 385-388. PCT Patent Appl. No. PCT/US09/59266 (Pinkerton) (the "PCT US09/59266 Application") described tunneling current switch assemblies having graphene drums (which graphene drums generally having a diameter between about 500 nm and about 1500 nm). As described in the PCT US09/59266 Application, which is incorporated herein by reference, the graphene drum is capable of completely sealing the chamber formed by the graphene drum (i.e., the graphene drum provides a complete seal to fluids inside and outside the chamber). A graphene membrane is atomically thin.

In embodiments of the present invention, graphene drums are employed in pump systems and engine systems, such as to replace pistons and valves in conventional pumps and engines. Advantages of utilizing graphene drums (and other electrically conductive drums that are atomically thin) in such systems include:
  a. Higher power density (because graphene drum "piston/valves" can operate in the MHz range (i.e., at least about 1 MHz) instead of the approximately 100 Hz range of conventional pumps and engines).
  b. Higher efficiency (because graphene can withstand high temperatures and no oil is required for graphene diaphragm motion).
  c. Quiet operation (because an operating frequency in the MHz range is not perceived by humans).
  d. Smaller size, as compared to conventional pumps and engines.
  e. More precise fluid flow.

For instance, U.S. Pat. No. 7,008,193 (Najafi) ("the Najafi Patent") is directed to a MEMS-fabricated microvacuum pump assembly that utilizes a diaphragm made of a metal with a polymer layer on each side that is not atomically thin. Accordingly, the pump assembly is limited to kHz operation (resulting in slow pump speed) and requires a relatively high voltage to actuate (to overcome the inertia and stiffness of a thick diaphragm). It is believed that, unlike graphene drums and other atomically thin, electrically conductive drums, the MEMS-fabricated microvacuum pump assembly of the Najafi Patent cannot maintain a high vacuum on one side. This would be disadvantageous because a vacuum enables a high electric field (and, thus, a high actuation force, between the gate and the diaphragm without arcing). The Najafi Patent also appears to be a high wear device because the pump and valve membranes of the MEMS-fabricated microvacuum pump assembly require repeated physical contact with other parts of the pump assembly to operate properly. This is disadvantageous compared to embodiments of the present invention in that the present invention does not require the graphene drum or other atomically thin, electrically conductive drum to come in contact with other parts of the pump to work.

As used herein, a "graphene-drum pump system" is a pump system that utilizes one or more graphene drums (such as a pump system that utilizes an array of graphene drums). A "graphene-drum pump" is a pump that utilizes a graphene drum, such as a pump that utilizes the graphene drum to displace the fluid during operation of the pump. A "graphene-drum engine system" is an engine system that utilizes one or more graphene drums (such as an engine system that utilizes an array of graphene drums). A "graphene-pump engine" is an engine that utilizes a graphene drum, such as an engine that utilizes a graphene drum to displace fluid during operation of the engine.

As a graphene drum may be between about 500 nm and about 1500 nm in diameter (i.e., around one micron in diameter), millions of graphene-drum pumps could fit on one square centimeter of a graphene-drum pump system or graphene-drum engine system. In other embodiments, the graphene drum may be between about 10 µm to about 20 µm) in diameter and have a maximum deflection between about 1 µm to about 3 µm (i.e., a maximum deflection that is about 10% to 15% of the diameter of the graphene drum). As used herein, "deflection" of the graphene drum is measured relative to the non-deflected graphene drum (i.e., the deflection of a non-deflected graphene drum is zero).

In some instances, it is advantageous to use two or more graphene membranes stacked on top of one another for use as a unit (such as for use as a diaphragm). Such a stack of two or more graphene membranes are referred to as a "multi graphene-membrane stack." While each of the individual graphene membranes of a multi graphene-membrane stack is atomically thin, the multi graphene-membrane stack itself generally is not. For instance, a multi graphene-membrane stack of a dozen graphene membranes generally would have a thickness of about 4 nm.

Alternatively, other types of electrically conductive membranes (also referred to as "electrically conductive drums") that are atomically thin may be utilized in lieu of graphene membranes in embodiments of the present invention, such as, for example, graphene oxide membranes. A stack of two or more electrically conductive membranes are referred to as a "multi electrically-conductive-membrane stack."

Alternatively, polymer films that are 1 to 20 micrometers in thickness having a conductive coating (the coating has a conductivity in the range of ten thousand ohms/cm$^2$ to one billion ohms/cm$^2$), such as an antistatic fluid or a layer of a few nanometers of metal, can be used as the electrically conductive membrane in lieu of the graphene membrane. The polymer film can be polyester film or plastic sheet, such as polyethylene terephthalate (such as Mylar® film of DuPont Teijin Films). Further, for instance, the layer of a few nanometers of metal can be deposited by vapor-deposition. For such a coated polymer film membrane, the electrostatic force is linear with the electric field of the gates/stators of the present invention, is more robust (since it is greater than 1000 times thicker than graphene), and is much less expensive.

Moreover, the electrically conductive membranes or the multi electrically-conductive-membrane stack may include a thin (i.e., several nanometers in thickness) protective coating to protect the electrically conductive membranes from oxidation or corrosive fluids. For instance, a protective coating of graphene oxide or tungsten can be applied to a graphene drum.

In general, in one aspect, the invention features a pump that includes a cavity having a diaphragm. The diaphragm is operable to change the volume capacity of the cavity. The pump further includes an upstream valve connected to the cavity. The upstream valve is operable to be in an open position such that fluid can flow through the upstream valve into the cavity. The upstream valve is also operable to be in a closed position such that fluid cannot flow through the upstream valve into the cavity. The pump further includes a downstream valve connected to the cavity. The downstream valve is operable to be in an open position such that fluid can flow from the cavity through the downstream valve. The downstream valve is also operable to be in a closed position such that fluid cannot flow from the cavity through the downstream valve. At least one of the cavity, upstream valve, or downstream valve of the pump includes an electrically conductive drum. The electrically conductive drum is atomically thin.

In general, in another aspect, the invention features an engine that includes a cavity having a diaphragm. The diaphragm is operable to change the volume capacity of the cavity. The cavity is operable to receive a combustible fluid mixture that can ignite in the cavity to form a combusted fluid mixture. The engine further includes an upstream valve connected to the cavity. The upstream valve is operable to be in an open position such that the combustible fluid mixture can flow through the upstream valve into the cavity. The upstream valve is also operable to be in a closed position such that the combustible fluid mixture cannot flow through the upstream valve into the cavity. The engine further includes a downstream valve connected to the cavity. The downstream valve is operable to be in an open position such that the combusted fluid mixture can flow from the cavity through the downstream valve. The downstream valve is also operable to be in a closed position such that the combusted fluid mixture cannot flow from the cavity through the downstream valve. At least one of the cavity, upstream valve, or downstream valve in the engine includes an electrically conductive drum. The electrically conductive drum is atomically thin.

Implementations of the invention can include one or more of the following features:

The engine can further include an igniter positioned inside the cavity to ignite the combustible fluid mixture in the cavity to form the combusted fluid mixture.

The cavity can be operable to provide a pressure and a temperature inside the cavity to ignite the combustible fluid mixture in the cavity to form the combusted fluid mixture.

The electrically conductive drum can have a thickness between about 0.3 nm and about 1 nm.

The electrically conductive drum of the pump or the engine may be a graphene drum.

The electrically conductive drum can be a graphene oxide membrane.

The electrically conductive drum can have a protective coating.

At least one of the cavity, upstream valve, or downstream valve can include a multi electrically-conductive-drum stack of at least two electrically conductive drums.

The multi electrically-conductive-drum stack can have a protective coating.

The protective coating can include graphene oxide, tungsten, or a combination thereof. The protective coating can have a thickness less than about 5 nm. The protective coating can protect against oxidation, corrosive fluids, or both.

The cavity of the pump or the engine may include a first electrically conductive drum. The upstream valve of the pump or the engine may include a second electrically conductive drum. And, the downstream valve of the pump or the engine may include a third electrically conductive drum. The first electrically conductive drum, the second electrically conductive drum, and the third electrically conductive drum may all be part of one continuous sheet of electrically conductive material.

The first electrically conductive drum can be a first graphene drum. The second electrically conductive drum can be a second graphene drum. The third electrically conductive drum can be a third graphene drum.

The pump or the engine may further include a metallic gate. The electrically conductive drum may be operable to be pulled toward the metallic gate due to a voltage between the electrically conductive drum and the metallic gate. The metallic gate may include tungsten.

The diaphragm of the pump or the engine may be the electrically conductive drum.

The diaphragm may be operable to move to a first position such that the cavity has a first volume capacity. The diaphragm may be operable to move to a second position such that the cavity has a second volume capacity. The first volume capacity may be larger than the second larger capacity.

The diaphragm may operable to cycle back and forth between the first position and the second position at a frequency of at least about 1 MHz.

The pump or the engine may further include a second cavity. The diaphragm may be operable to change the volume capacity of the second cavity. As the volume capacity of the cavity increases, the volume capacity of the second cavity may decrease. As the volume capacity of the cavity decreases, the volume capacity of the second cavity may increase. The pump or the engine may further include a metallic gate located within the second cavity. The electrically conductive drum may be operable to be pulled toward the metallic gate due to a voltage between the electrically conductive drum and the metallic gate.

The second cavity of the pump or the engine may be under vacuum.

The upstream valve of the pump or the engine may include the electrically conductive drum. The electrically conductive drum may be operable to cycle back and forth between the open position and the closed position at a frequency of at least about 1 MHz.

The downstream valve of the pump or the engine may include the electrically conductive drum. The electrically conductive drum may be operable to cycle back and forth between the open position and the closed position at a frequency of at least about 1 MHz.

The electrically conductive drum of the pump or the engine may have a diameter between about 500 nm and about 1500 nm.

The electrically conductive drum may have a diameter between about 10 µm and about 20 µm. The electrically conductive drum may have a maximum deflection between about 1 µm and about 3 µm.

In general, in another aspect, the invention features an engine that includes a first cavity having a first electrically conductive drum. The first electrically conductive drum is atomically thin and is operable to change the volume of the first cavity. The engine further includes a second cavity having a second electrically conductive drum. The second electrically conductive drum is atomically thin and is operable to change the volume of the second cavity. The engine further includes a passage that allows fluid to flow between the first cavity and the second cavity. The engine further includes a heat exchanger operable to change the temperature of the fluid. The change of temperature of the fluid is either: (a) cooling the temperature of the fluid as it moves from the first cavity to the second cavity and heating the temperature of the fluid as it moves from the second cavity to the first cavity, or (b) heating the temperature of the fluid as it moves from the first cavity to the second cavity and cooling the temperature of the fluid as it moves from the second cavity to the first cavity. The engine further includes a metallic gate located in the first cavity. The first electrically conductive drum is operable to move away from the metallic gate to generate energy.

Implementations of the invention can include one or more of the following features:

The first electrically conductive drum may be a first graphene drum. The second electrically conductive drum may be a second graphene drum.

The first electrically conductive drum may have a diameter between about 500 nm and about 1500 nm. The second electrically conductive drum may have a diameter between about 500 nm and about 1500 nm.

The first electrically conductive drum may have a diameter between about 10 µm and about 20 µm. The second electrically conductive drum may have a diameter between about 10 µm and about 20 µm.

The first electrically conductive drum may have a maximum deflection between about 1 µm and about 3 µm. The second electrically conductive drum may have a maximum deflection between about 1 µm and about 3 µm.

The engine may further include a plurality of thermally conductive nanowires. The plurality of the thermally conductive nanowires may be operatively connected to the cool cavity. The cool cavity may be the first cavity or the second cavity. The thermally conductive nanowires may be operable to cool the cool cavity.

Implementations of the invention can include one or more of the following features:

The pump or engine of the above embodiments may further include an insulating material. The insulating material may be silicon dioxide.

In general, in another aspect, the invention features a pump system that includes an array of pumps. The pumps in that array are pumps of one or more of the above embodiments.

In general, in another aspect, the invention features an engine system that includes an array of engines. The pumps in that array are engines of one or more of the above embodiments.

In general, in another aspect, the invention features a method of operating one of the pumps of the above embodiments.

In general, in another aspect, the invention features a method of operating one of the pump systems of the above embodiments.

In general, in another aspect, the invention features a method of operating one of the engines of the above embodiments.

In general, in another aspect, the invention features a method of operating one of the engine systems of the above embodiments.

In general, in another aspect, the invention features a method that includes opening an upstream valve to allow fluid to flow through the upstream valve to a cavity. The cavity is connected to a downstream valve that is in a closed position. The method further includes closing the upstream valve. The method further includes reducing the volume capacity in the cavity. The method further includes opening the downstream valve to allow the fluid to flow from the cavity to through the downstream valve while maintaining the upstream valve in the closed position. At least one of the cavity, upstream valve, or downstream valve includes an electrically conductive drum. The electrically conductive drum is atomically thin.

In general, in another aspect, the invention features a method that includes opening an upstream valve to allow combustible fluid mixture to flow through the upstream valve to a cavity. The cavity is connected to a downstream valve that is in a closed position. The method further includes closing the upstream valve. The method further includes reducing the volume capacity of the cavity. The method further includes igniting the combustible fluid mixture forming a combusted fluid mixture that expands the volume capacity of the cavity. The method further includes opening the downstream valve to allow the fluid to flow from the cavity to through the downstream valve while maintaining the upstream valve in the closed position. At least one of the cavity, upstream valve, or downstream valve includes an electrically conductive drum. The electrically conductive is atomically thin.

In general, in another aspect, the invention features a method that includes flowing a fluid from a first cavity to a second cavity. The first cavity has a first electrically conductive drum that moves to decrease the volume of the first cavity. The first electrically conductive drum is atomically thin. The second cavity has a second electrically conductive drum that moves to increase the volume of the second cavity. The second electrically conductive drum is atomically thin. The fluid is heated. The method further includes flowing fluid from the second cavity to the first cavity. The first electrically conductive drum moves to increase the volume of the first cavity. The second electrically conductive drum moves to decrease the volume of the second cavity. The fluid is cooled. The method further includes a voltage is applied to a metallic gate. The metallic gate is located by the first electrically conductive drum or the second electrically conductive drum. Energy is generated when that electrically conductive drum (i.e., the first electrically conductive drum or the second electrically conductive drum located by the metallic gate) moves away from the metallic gate.

Implementations of the invention can include one or more of the following features:

The electrically conductive drums can be graphene drums.

In general, in another aspect, the invention features a valve that includes a cavity. The cavity has an electrically conductive membrane and an opening for flowing fluid though the cavity. The electrically conductive membrane is atomically thin. The valve further includes a gate operable to move the electrically conductive membrane between a first position and second position due to a change in voltage applied to the gate. When the electrically conductive membrane is in the first position, the electrically conductive membrane is located away from the opening such that fluid can flow freely through the opening. When the electrically conductive membrane is in the second position, the electrically conductive membrane is located at a predetermined distance from the opening such that fluid flow though the opening is restricted.

Implementations of the invention can include one or more of the following features:

The valve can further include an electrical conductor located near the opening. When the electrically conductive membrane is located at or near the second position, the electrical conductor and electrically conductive membrane are operatively connected to allow a current to flow therebetween that is indicative of the location of the electrically conductive membrane.

The valve may further include a controller operable to control the voltage applied to the gate by utilizing the current to adjust the gate voltage so that the electrically conductive membrane is located at the second position.

The current may be a tunneling current.

The valve can further include a resistor and a voltage source that are operatively connected to the electrically conductive membrane and the gate. When the electrically conductive membrane is located near the second position, a current can operatively flow through the resistor that passively lowers the voltage between the electrically conductive membrane and the gate.

The valve can further include a capacitor sensor. The capacitor sensor is operatively connected to the electrically conductive membrane and the gate such that it may detect a change of capacitance between the electrically conductive membrane and the gate that is indicative of the location of the electrically conductive membrane.

The valve can further include a controller operable to control the voltage applied to the gate by utilizing the capacitance to adjust the gate voltage so that the electrically conductive membrane is located at the second position.

The valve can be operable to prevent the electrically conductive member from coming in contact with the gate.

The valve can further include a non-conductive member located between the electrically conductive membrane and the gate. The non-conductive member can prevent the electrically conductive membrane from coming in contact with the gate.

The electrically conductive membrane can be located at a distance such that stiffness of the electrically conductive membrane precludes the electrically conductive membrane from deflecting to a degree in which the electrically conductive membrane comes in contact with gate.

The valve can further include a sensor and stabilizer system operable for preventing the electrically conductive membrane from coming in contact with the gate.

The electrically conductive membrane may be a graphene membrane.

The predetermined distance may be about 1 nm.
The predetermined distance may be about 0.5 nm.
The predetermined distance may be about 0.3 nm.
The predetermine distance may be small enough to prevent most molecules of the fluid from flowing though the opening and may be big enough to avoid wear of the valve.

The predetermined distance may be a range of distances from the opening. The predetermined distance may be a range of distances between about 0.3 nm and about 1 nm. The predetermined distance may be a range of distances of about 0.7 nm±50%.

In general, in another aspect, the invention features a method of operating one of the valves of the above embodiments.

In general, in another aspect, the invention features a pump that includes one of the valves of the above embodiments.

In general, in another aspect, the invention features a pump of one of the above pump embodiments that includes one of the valves of the above valve embodiments.

In general, in another aspect, the invention features a method of operating one of the pumps of the above embodiments.

In general, in another aspect, the invention features a device that includes a pump. The pump includes a cavity having a diaphragm. The diaphragm is operable to change the volume capacity of the cavity. The pump further includes a first valve connected to the cavity. The first valve is operable to be in an open position in which fluid can flow (a) through the first valve into the cavity and (b) from the cavity through the first valve, depending upon the pressure differential across the first valve. The first valve is further operable to be in a closed position in which fluid cannot flow (a) through the first valve into the cavity and (b) from the cavity through the first valve, regardless of the pressure differential across the first valve. The pump further includes a second valve connected to the cavity. The second valve is operable to be in an open position in which fluid can flow (a) through the second valve into the cavity and (b) from the cavity through the second valve, depending upon the pressure differential across the second valve. The second valve is further operable to be in a closed position in which fluid cannot flow (a) through the second valve into the cavity and (b) from the cavity through the second valve, regardless of the pressure differential across the second valve. At least one of the cavity, first valve, or second valve includes an electrically conductive drum. The electrically conductive drum is atomically thin.

Implementations of the invention can include one or more of the following features:

The device may be operable as a speaker. The device may be operable as a compact audio speaker.

The electrically conductive drum may be a graphene drum.

The graphene drum may be operable for producing an audio signal having a frequency in the audio frequency range. The frequency may be between about 20 Hz and about 20 kHz.

The graphene drum may be operable for producing an audio signal having a frequency in the audio frequency range by alternating the flow of air through the pump in a first direction and a second direction. The first direction of the air flow may be flowing the air through the first valve, into and through the cavity, and through the second valve. The second direction of the air flow may be flowing air through the second valve, into and through the cavity, and through the first valve. The rate of alternating the flow of air may be the frequency of the audio signal.

The device may be operable for medical applications.
The device may be operable for drug delivery.
The device may be operable as a heart pump.
The device may be operable for electronic applications.
The device may be operable as an ink pump.

The device may be operable as a fan.

The device may be operable to flow the fluid in a first direction through the first valve, into and through the cavity, and through the second valve, while the device is not operable to flow the fluid in a second direction through the second valve, into and through the cavity, and through the first valve.

In general, in another aspect, the invention features a method of operating one of the device of the above embodiments.

In general, in another aspect, the invention features a system that includes a first device including a first electrically conductive membrane pump system. The first electrically conductive membrane pump system includes one or more first electrically conductive membranes. The first electrically conductive membrane pump system is operable to transmit information through the air via ultrasonic waves. The system further includes a second device including a second electrically conductive membrane pump system. The second electrically conductive membrane pump system includes one or more first electrically conductive membranes. The second electrically conductive membrane pump system is operable to receive the information transmitted through the air via ultrasonic waves by the first device. The second electrically conductive membrane pump system is further operable to emit sound within the auditory range of humans that corresponds to the information transmitted.

Implementations of the invention can include one or more of the following features:

The one or more first electrically conductive membranes can be one or more graphene membranes.

The one or more second electrically conductive membranes can be one or more graphene membranes.

The ultrasonic waves can have a frequency in a range between 20 KHz and 1000 kHz.

The first electrically conductive membrane pump system can further include a gate and a trace operatively connected to at least one of the one or more first electrically conductive membranes. The first electrically conductive membrane pump system can further include an input voltage source operatively connected to the gate and the trace. The input voltage source can be operable to control movement of the at least one of the first electrically conductive membranes to generate the ultrasonic waves.

The first device can be selected from the group consisting of a smart-phone or a smart-watch. The second device can be an earbud.

The first device can be a smart-watch.

The second device can be an earbud.

The second electrically conductive membrane pump system can be operable to harvest power from the ultrasonic waves transmitted from the first device.

The second device can be a pair of earbuds.

The information transmitted from the first device and received by the second device can include information from an audio file.

The information transmitted from the first device and received by the second device can include a first component and a second component. The first component can include information that corresponds to the sound emitted by the second device within the auditory range of humans. The second component can pair the first device and the second device such that the second device can be informed from the second component to allow the sound corresponding to the first component to be emitted.

In general, in another aspect, the invention features a device that includes an electrically conductive membrane pump. The electrically conductive membrane pump includes a cavity having an electrically conductive membrane. The electrically conductive membrane is operable to change the volume capacity of the cavity. The electrically conductive membrane includes a polymer coated with a conductive coating. The conductive coating has a conductivity in the range of ten thousand ohms/cm$^2$ to one billion ohms/cm$^2$. The electrically conductive membrane pump further includes a gate and a trace operatively connected to the electrically conductive membrane. The electrically conductive membrane pump further includes an input voltage source operatively connected to the gate and the trace. The input voltage source is operable to control movement of the electrically conductive membrane to change the volume capacity of the cavity.

Implementations of the invention can include one or more of the following features:

The polymer film can include polyethylene terephthalate.

The conductive coating can be formed from the deposition of an antistatic fluid on the polymer.

The conductive coating can be less than 5 nm in thickness.

The conductive coating can include a metal.

The conductive coating can be less than 5 nm in thickness.

The conductive coating can be formed from the deposition of the metal using vapor deposition.

The device can be operable as a speaker.

The device can be operable as a compact audio speaker.

The electrically conductive membrane can be operable for producing an audio signal having a frequency in the audio frequency range.

The device can be operable for medical applications.

The device can be operable for electronic applications.

In general, in another aspect, the invention features a device that includes an electrically conductive membrane pump. The electrically conductive membrane pump includes a cavity having an electrically conductive membrane. The diaphragm is operable to change the volume capacity of the cavity. The electrically conductive membrane pump further includes a first valve connected to the cavity. The first valve is operable to be in an open position inwhich fluid can flow (I) through the first valve into the cavity and (II) from the cavity through the first valve, depending upon the pressure differential across the first valve. The electrically conductive membrane pump further includes the first valve is operable to be in a closed position inwhich fluid cannot flow (I) through the first valve into the cavity and (II) from the cavity through the first valve, regardless of the pressure differential across the first valve. The electrically conductive membrane pump further includes a second valve connected to the cavity. The second valve is operable to be in an open position inwhich fluid can flow (I) through the second valve into the cavity and (II) from the cavity through the second valve, depending upon the pressure differential across the second valve. The second valve is operable to be in a closed position inwhich fluid cannot flow (I) through the second valve into the cavity and (II) from the cavity through the second valve, regardless of the pressure differential across the second valve. At least one of the cavity, first valve, or second valve includes an electrically conductive membrane. The electrically conductive membrane includes a polymer coated with a conductive coating. The conductive coating has a conductivity in in the range of ten thousand ohms/cm$^2$ to one billion ohms/cm$^2$.

In general, in another aspect, the invention features an earbud system. The earbud system includes a first device that is an earbud including a first graphene-based ultrasonic transducer. The earbud system includes a second device including a second graphene-based ultrasonic transducer. The second graphene-based ultrasonic transducer is operable to exchange information with the first graphene-based ultrasonic transducer.

Implementations of the invention can include one or more of the following features:

The second device can be a smart-watch.

The second device can be a smart-phone.

The first graphene-based ultrasonic transducer of the earbud can be operable to transmit an ultrasonic signal containing the information to the second graphene-based ultrasonic transducer of the second device.

The information can include heart rate data.

The second graphene-based ultrasonic transducer of the second device can be operable to transmit an ultrasonic signal containing the information to the first graphene-based ultrasonic transducer of the earbud.

The information can include an audio file.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DETAILED DESCRIPTION

Figure 1:
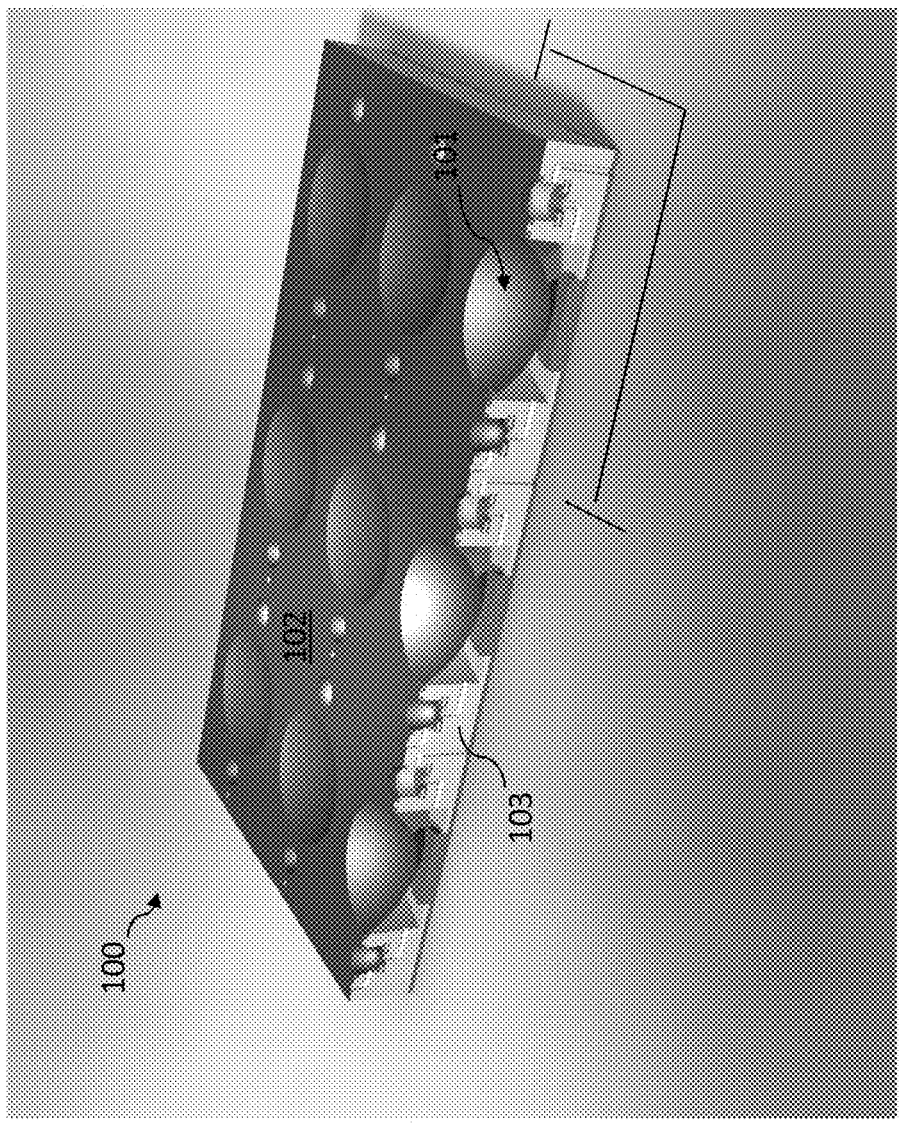
FIG. 1 depicts a perspective view of the graphene-drum pump system.

In an embodiment of the present invention, one or more graphene drums can be utilized in a pump system. FIG. 1 depicts a graphene-drum pump system 100 that has an array of graphene-drum pumps 101 (as illustrated there are nine graphene pumps 101 in FIG. 1). As oriented in FIG. 1, the top layer 102 is graphene. The top layer is mounted on an insulating material 103 (such as silicon dioxide).

Figure 2:
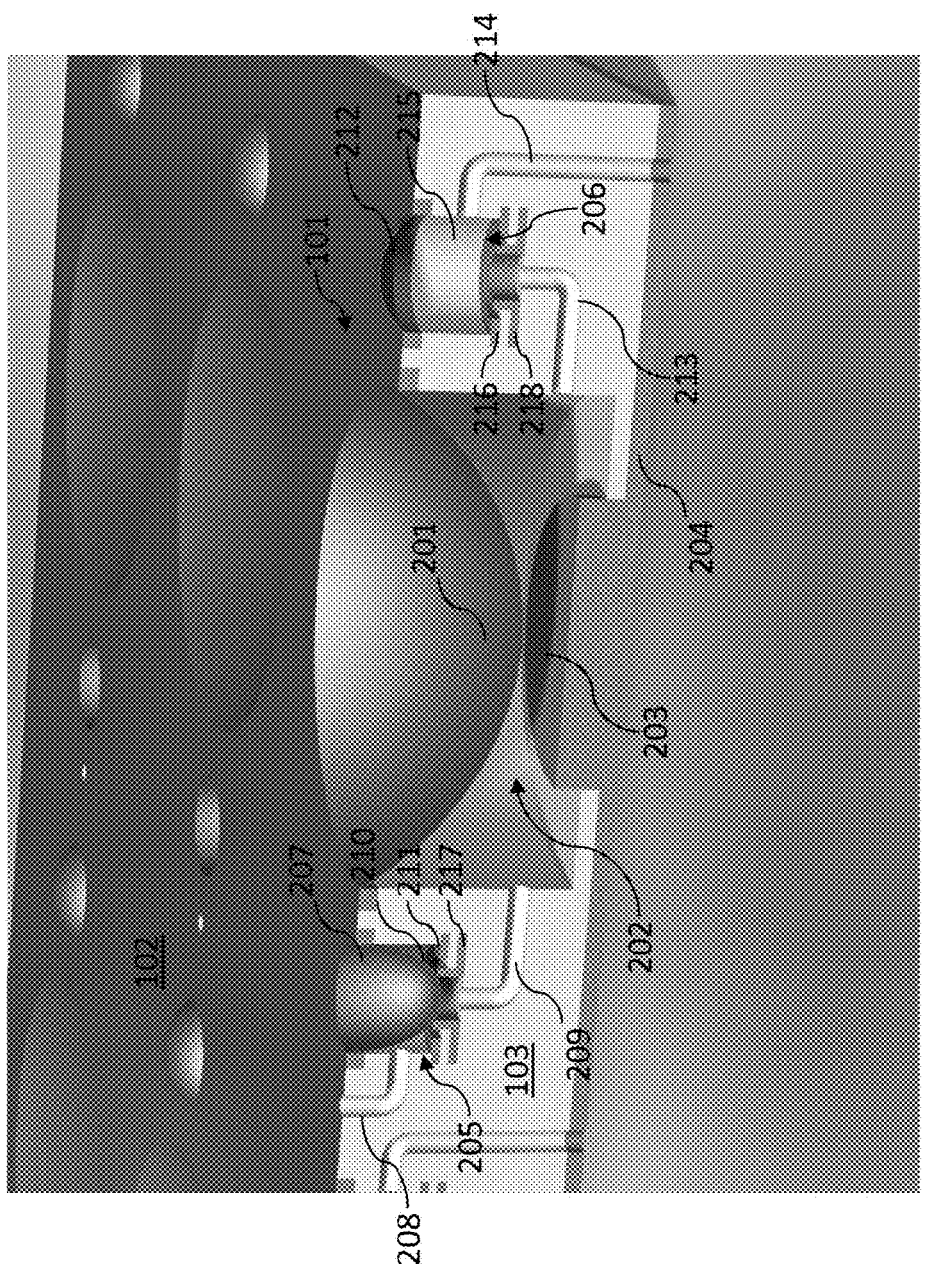
FIG. 2 depicts a close-up of a graphene-drum pump (in the graphene-drum pump system of FIG. 1) in exhaust mode.

FIG. 2 depicts a close-up of a graphene-drum pump 101 in the graphene-drum pump system 100 of FIG. 1. Graphene-drum pump 101 utilizes a graphene drum as the main diaphragm (main diaphragm graphene drum 201). The main diaphragm seals a boundary of the cavity 202 of the graphene-drum pump 101. The cavity is also bounded by insulating material 103 and a metallic gate 203 (which is a metal such as tungsten). The metallic gate 203 is operatively connected to a voltage source (not shown), such as by a metallic trace 204. The main diaphragm graphene drum 201 can be designed to operate in a manner similar to the graphene drums taught and described in the PCT US09/59266 Application.

The graphene-drum pump also includes an upstream valve 205 and a downstream valve 206. As illustrated in FIG. 2, upstream valve 205 includes another graphene drum (the upstream valve graphene drum 207). The upstream valve 205 is connected (a) to a fluid source (not shown) by a conduit 208 and (b) to the cavity 202 by conduit 209, which conduits 208 and 209 are operable to allow fluid (such as a gas or a liquid) to flow from the fluid source through the upstream valve 205 and into the cavity 202. The upstream valve 205 also has a cavity 210 bounded (and sealed) by the upstream valve graphene drum 207, the insulating material 103, and upstream valve gate 211. The upstream valve graphene drum 207 can be designed to operate in a manner similar to the graphene drums taught and described in the PCT US09/59266 Application. For instance, the upstream valve 205 can be closed or opened by varying the voltage between upstream valve graphene drum 207 and upstream valve gate 211. When the upstream valve 205 is closed, van der Waals forces will maintain the upstream valve graphene drum 207 in the seated position, which will keep the upstream valve 205 in the closed position.

As illustrated in FIG. 2, the downstream valve 206 includes another graphene drum (the downstream valve graphene drum 212). The downstream valve 206 is connected (a) to the cavity 202 by a conduit 213 and (b) to a fluid output (not shown) by conduit 214, which conduits 213 and 214 are operable to allow fluid to flow from the cavity 202 through the downstream valve 205 and into the fluid output. The downstream valve 206 also has a cavity 215 bounded (and sealed) by the downstream valve graphene drum 212, the insulating material 103, and downstream valve gate 216. The downstream valve graphene drum 212 can be designed to operate in a manner similar to the graphene drums taught and described in the PCT US09/59266 Application. For instance, the downstream valve 206 can be closed or opened by varying the voltage between downstream valve graphene drum 212 and downstream valve gate 216. When the downstream valve 206 is closed, van der Waals forces will maintain the downstream valve graphene drum 212 in the seated position, which will keep the downstream valve 206 in the closed position. Generally, upstream valve gate 211 and downstream valve gate 216 are synchronized so that when the upstream valve 205 is opened, downstream valve is closed (and vice versa).

FIG. 2 depicts the graphene-drum pump 101 in exhaust mode. In the exhaust mode, the upstream valve 205 is closed and the downstream valve 206 is opened, while the main diaphragm graphene drum 201 is being pulled downward (such as due to a voltage between the main diaphragm graphene drum 201 and metallic gate 203). This results in the fluid (such as air) being pumped from the cavity 202 through the downstream valve 205 and into the fluid output.

Figure 3:
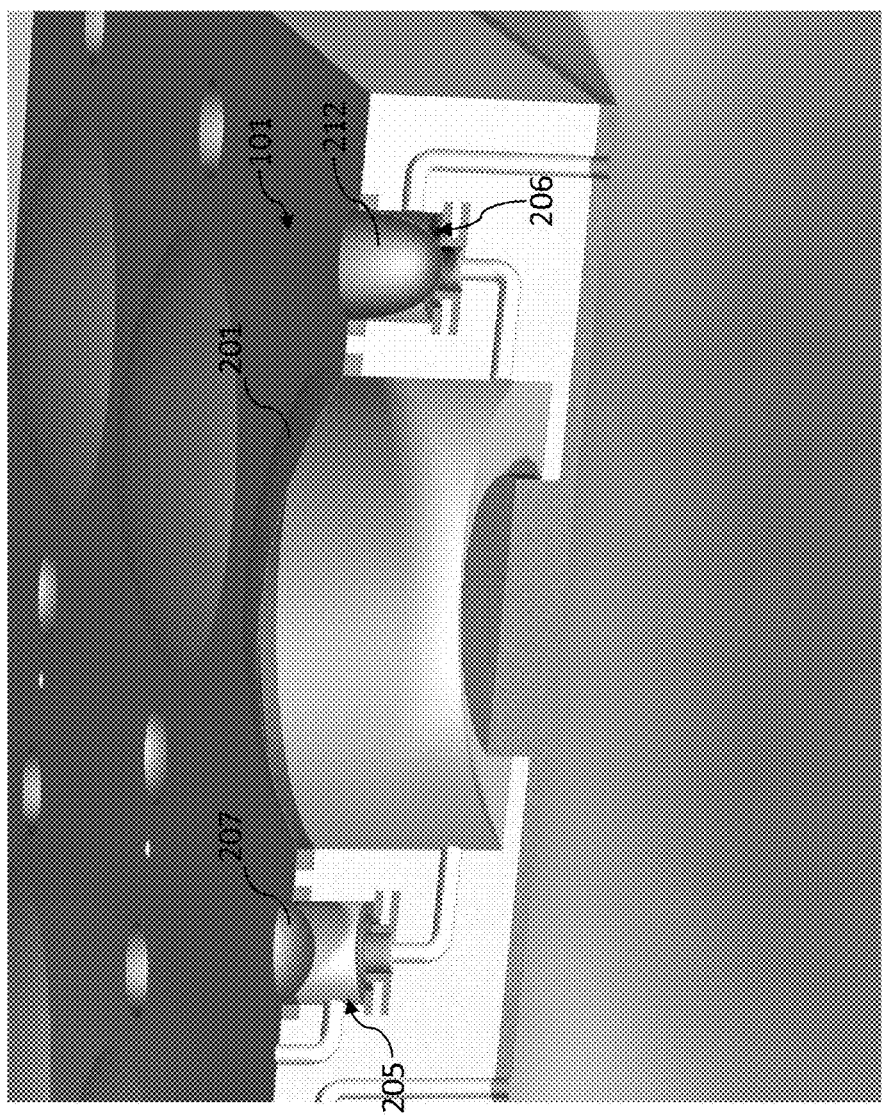
FIG. 3 depicts a close-up of a graphene-drum pump (in the graphene-drum pump system of FIG. 1) in intake mode.

FIG. 3 depicts the graphene-drum pump 101 in intake mode. In the intake mode, the upstream valve 205 is opened and the downstream valve 206 is closed, while the main diaphragm graphene drum 201 moves upward. (For instance, by reducing the voltage between the main diaphragm graphene drum 201 and metallic gate 203, the graphene drum 201 will spring upward beyond its "relaxed" position). This results in the fluid (such as air) being drawn from the fluid source through the upstream valve 205 and into the cavity 202.

To reduce or avoid wear of the upstream valve 205 that utilizes an upstream valve graphene drum 207, embodiments of the invention can include an upstream valve element 217 to sense the position between the upstream valve graphene drum 207 and bottom of cavity 210. Likewise to reduce or avoid wear of the downstream valve 206 that utilizes a downstream valve graphene drum 212, embodiments of the invention can include an downstream valve element 218 to sense the position between the downstream valve graphene drum 212 and bottom of cavity 215. The reason for this is because of the wear that upstream valve 205 and downstream valve 206 will incur during cyclic operation, which can be on the order of 100 trillion cycles during the device lifetime. Because of such wear, upstream valve graphene drum 207 and downstream valve graphene drum 212 cannot repeatedly hit down upon the channel openings to conduit 209 and conduit 213, respectively.

As shown in FIG. 2, upstream valve element 217 is shown in the center/bottom of cavity 210 of the upper valve 205, and downstream valve element 218 is shown in the center/bottom of cavity 215 of downstream valve 206. Upstream valve element 217 is used to sense the position of the upstream valve graphene drum 207 relative to the bottom of cavity 210 by using extremely sensitive tunneling currents as feedback. A separate circuit (not shown) is connected between the upstream valve element 217 and the upstream valve graphene drum 207. Likewise downstream valve element 218 is used to sense the position of the downstream valve graphene drum 207 relative to the bottom of cavity 215 by using extremely sensitive tunneling currents as feedback. A separate circuit (not shown) is connected between the upstream valve element 218 and the upstream valve graphene drum 212.

With respect to the upstream valve 205, when the upstream valve graphene drum 207 is within about 1 nm of the upstream valve element 217, a significant tunneling current will flow between the upstream valve graphene drum 205 and the upstream valve element 217. This current can be used as feedback to control the voltage of upstream valve gate 211. When this current is too high, the gate voltage of upstream valve gate 211 will be decreased. And, when this current is too low, the gate voltage of upstream valve gate 211 will be increased (so that the valve stays in its "closed" position, as shown in FIG. 2, until it is instructed to open). There will likely be a gap (around 0.5 nm) between the upstream valve graphene drum 207 and channel opening to conduit 209 when the upstream valve 205 is closed; this gap is so small that it prevents most fluid molecules from passing through the upstream valve 205 yet the gap is large enough to avoid wear. For instance, in an embodiment of the invention, a resistor and voltage source (not shown) can be utilized. The resistor can be placed between the upstream valve element 217 and the voltage source. When the upstream valve graphene drum 207 comes within tunneling current distance (such as around 0.3 to 1 nanometers) of upstream valve element 217, the tunneling current will flow through upstream valve graphene drum 207, upstream valve element 217 and the resistor. This tunneling current in combination with the resistor will lower the voltage between upstream valve element 217 and upstream valve graphene drum 207, thus lowering the electrostatic force between upstream valve element 217 and upstream valve graphene drum 207. If upstream valve graphene drum upstream valve graphene drum moves away from upstream valve graphene 217, the tunneling current will drop and the voltage/force between upstream valve graphene drum 207 and upstream valve element 217 will increase. Thus a 0.3 to 1 nanometer gap between upstream valve graphene drum 207 and upstream valve element 217 is maintained passively which allows the valve to close without causing mechanical wear between upstream valve graphene drum 207 and upstream valve element 217.

With respect to downstream valve 206, downstream valve element 218 can be utilized similarly.

In further embodiments, while not shown, standard silicon elements (such as transistors) can be integrated within or near the insulating material 103 near the respective graphene drums (main diaphragm graphene drum 201, upstream valve graphene drum 207, or downstream valve graphene drum 212) to help control the respective graphene drum and gate set.

In further embodiments, in lieu of using tunneling currents as feedback, the feedback can be the change in capacitance between upstream valve graphene drum 207 and upstream valve gate 211. For instance, a capacitance sensor can be used to detecting the change of capacitance, which would be indicative of the location of the graphene drum.

Embodiments of the graphene-drum pump system 100 shown in FIG. 1 (and graphene-drum pump 101 shown in FIGS. 2-3) as described above, can be modified to operate as a graphene-drum internal combustion engine system. In such instance, the intake fluids from the fluid source can include a combustible fluid mixture (such as fuel and oxygen from the air). Furthermore, the opening and closing of the upstream valve 205 and the downstream valve 206 are generally designed to operate independently (such that both valves can be closed at the same time).

The process by which the graphene-drum internal combustion engine system operates can be as follows.

Intake step: In the intake step, the combustible fluid mixture is placed in the combustion chamber. For example, similar to the pump intake illustrated in FIG. 3, the upstream valve 205 is opened and the downstream valve 206 is closed, while the main diaphragm graphene drum 201 moves upward (such as reducing the voltage between the main diaphragm graphene drum 201 and metallic gate 203). This results in the combustible fluid mixture being drawn from the fluid source through the upstream valve 205 and into the cavity 202.

Compression step: In the compression step, the upstream valve 205 is closed while maintaining the downstream valve 206 in the closed position. The main diaphragm graphene drum 201 is then pulled downward (such as due to a voltage between the main diaphragm graphene drum 201 and metallic gate 203). This results in compression of the combustible fluid mixture in the cavity 202.

Figure 4:
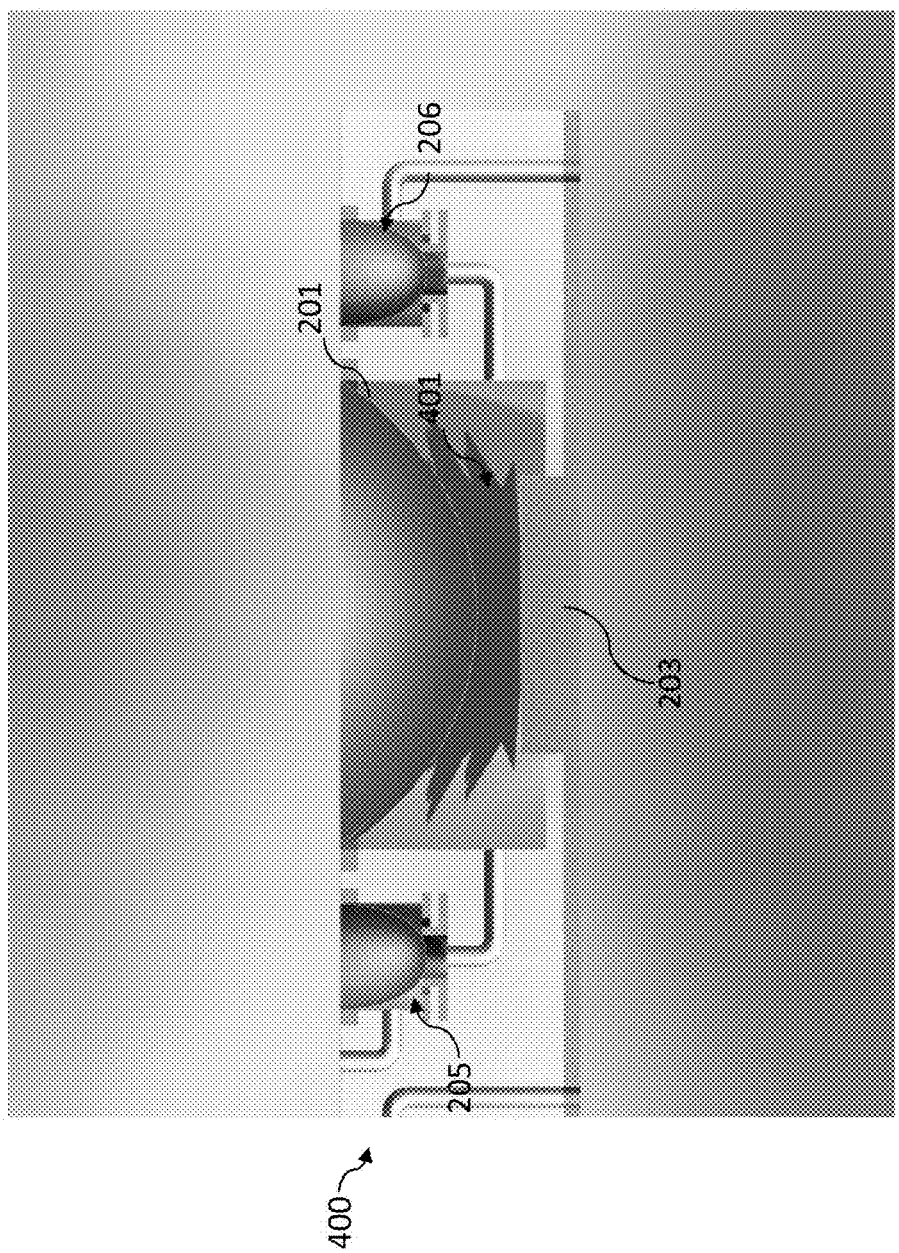
FIG. 4 depicts a graphene-drum internal combustion engine in ignition mode.

Ignition Step: In the ignition step, the combustible fluid mixture is ignited. FIG. 4 depicts a graphene-drum internal combustion engine 400 in the ignition mode. For instance, a metallic trace or via (connected to a voltage source) can provide a high-voltage electrical spark to ignite the combustible fluid mixture in the cavity 202. FIG. 4 depicts the ignited combustible fluid mixture 401. This figure also depicts that upstream valve 205 and the downstream valve 206 are generally closed during the ignition step.

Instead of drawing in just air or some other fluid, the engine system would draw in an air-fuel mixture. Like conventional internal combustion engine, the graphene-drum internal combustion engine can compress the fuel-air mix until it reached ignition (or was set off by a spark between main graphene drum and gate), the hot gas would then expand during the power stroke and then, as discussed below, the exhaust pumped out. Unlike a conventional internal combustion engine, the graphene-drum internal combustion engine can use the time-varying capacitance between the graphene drum 201 and metallic gate 203 to extract electrical power from system during power stroke. Compressing the fuel-air mixture is accomplished by applying a voltage between graphene drum 201 and metallic gate 203. This compression voltage can also be used to seed the time-varying capacitance process needed for power extraction. The valves would work in same manner as described for pump above.

This results in expansion of the combusted fluid mixture, which can then be used to produce useful work. Such expansion generally acts to cool the combusted fluid mixture and vary the capacitance between metallic gate 203 and graphene drum 201. This time varying capacitance can be used along with external circuitry (not shown) to covert expansion forces into electrical energy.

Exhaust Step: In the exhaust step, the cooled combusted fluid mixture is exhausted. For example, similar to the pump exhaust illustrated in FIG. 2, the upstream valve 205 is closed and the downstream valve 206 is opened, while the main diaphragm graphene drum 201 is being pulled downward (such as due to a voltage between the main diaphragm graphene drum 201 and metallic gate 203). This results in the cooled combusted fluid mixture being pumped from the cavity 202 through the downstream valve 206 and into the fluid output. Generally, the cooled combusted fluid mixture will ultimately be exhausted to atmosphere.

Figure 5:
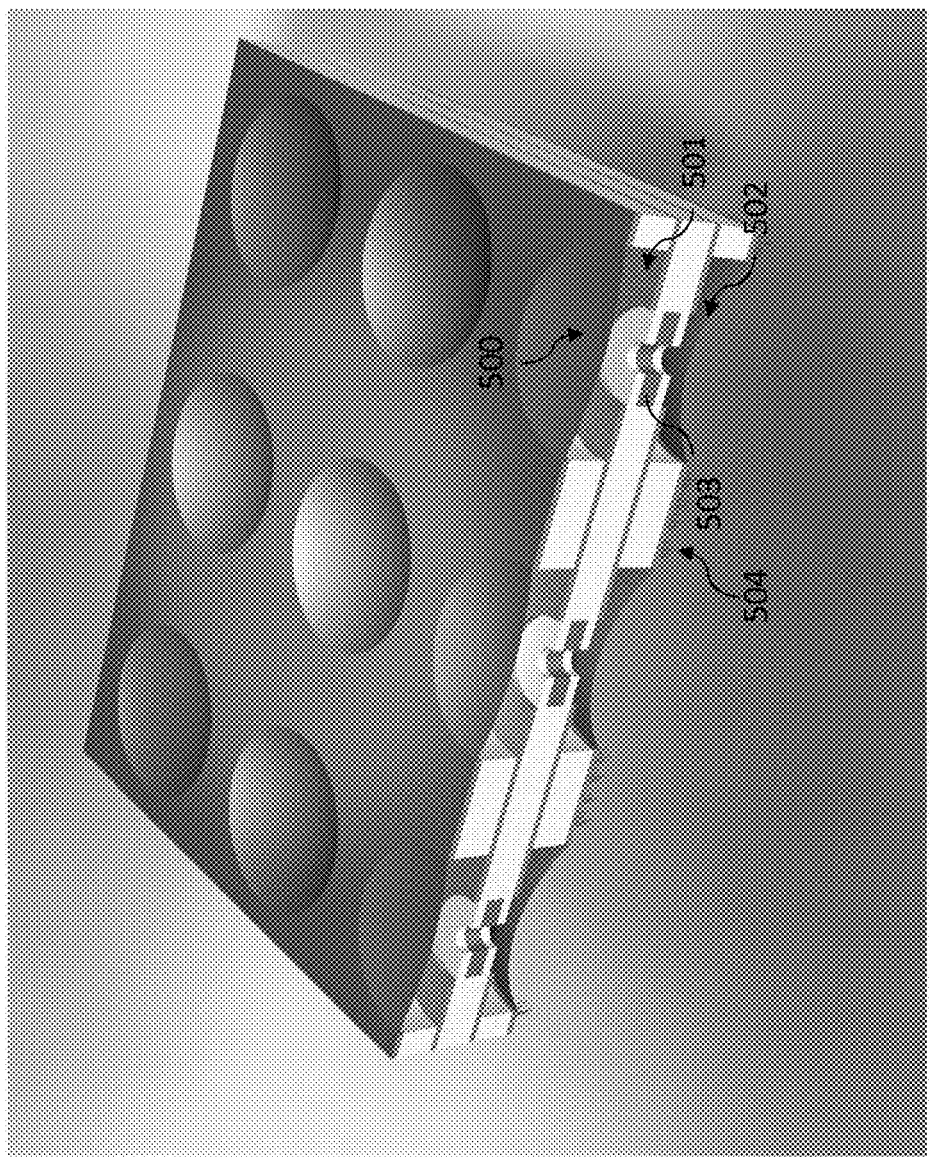
FIG. 5 depicts a perspective view of a graphene-drum Stirling engine system.
Figure 6:
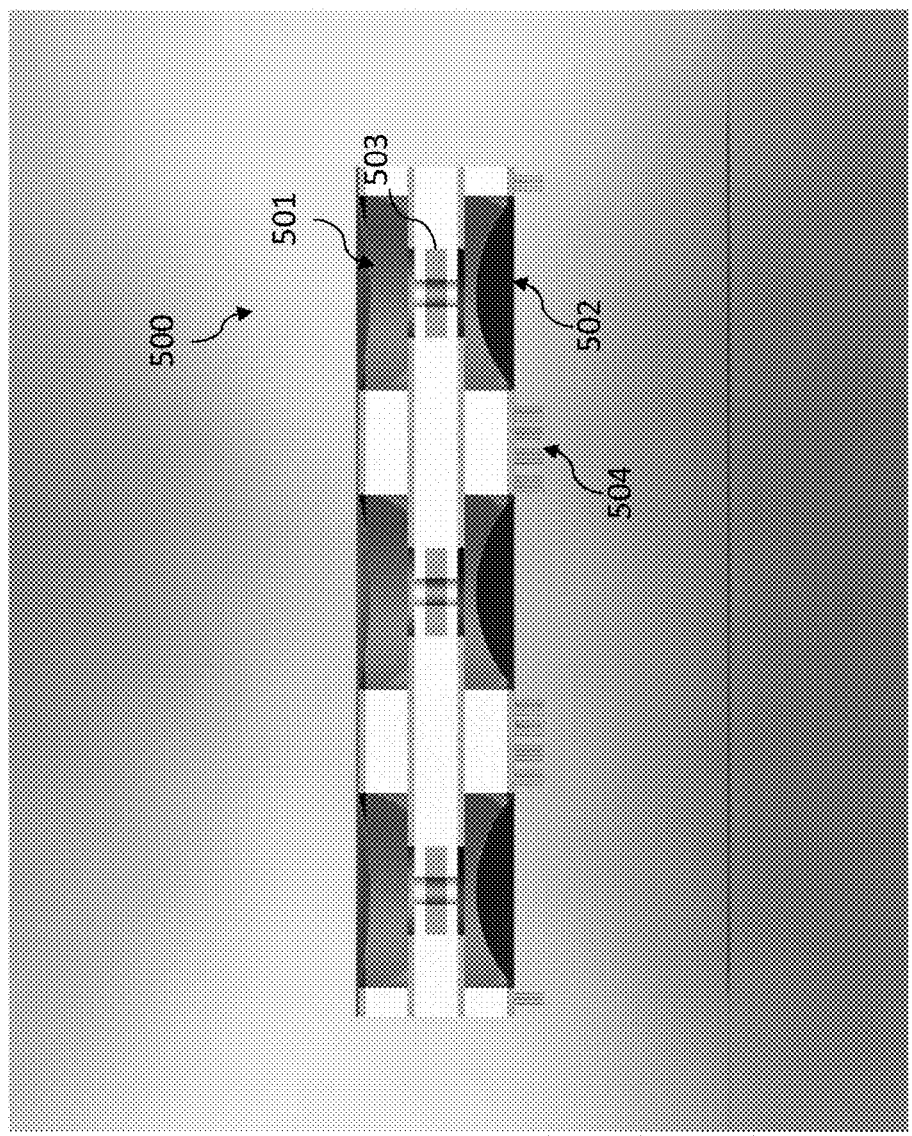
FIG. 6 depicts a side view of the graphene-drum Stirling engine system of FIG. 5.

In other embodiments of the present invention, the graphene-drum pump system is a graphene-drum Stirling engine system 501, such as depicted in FIG. 5. FIG. 6 depicts a side view of the graphene-drum Stirling engine system of FIG. 5. Like a conventional Stirling engine, the graphene-drum Stirling engine would use a temperature differential (as oriented in the FIG. 5-6, top part 501 of device 500 is kept hot, and bottom part 502 of device 500 cold) to drive the "pistons." Device 500 is sealed with a working gas (air, helium, etc.) that can move back and forth between the hot side 501 and the cool side 502. Like the graphene-drum internal combustion engine described above, power would be extracted by seeding the gate with a voltage and then extracting power as the graphene membrane pulled away from the gate. A piezoelectric film in contact with the graphene drums might also be used to extract power from the oscillating membranes. The metal 503 in the center of device 500 is a heat exchanger that cools the working gas as it moves from hot side 501 to cool side 502 and heats the working gas as it moves from cool side 502 to hot side 501. The hair-like structures 504 shown on the bottom of the device 500 can be carbon nanotubes or another kind of thermally conductive nanowire to help keep cool side 502 cool (conventional thermal fins might also be used). Hot side 501 might be in thermal contact with a warm microprocessor to help cool and power the processor. Sunlight could be focused on hot side 501 to generate electrical power at efficiencies that likely exceed photo voltaic cells.

The primary way to extract power from both internal combustion and Stirling graphene-drum engines is by exploiting the fact that the capacitance between the graphene drum and the gate varies with time. If a voltage is placed between the graphene drum and the gate (just before the graphene drum pulls away from the gate), a current will be generated that is proportional to this seed voltage times $dC/dt$ (the time rate of change of graphene drum-gate capacitance). The energy output is proportional to the force to separate the graphene drum away from the gate times the distance of travel of the graphene drum. Extracting energy from time-varying capacitors is further described in Miyazaki M., et al., "Electric-Energy Generation Using Variable-Capacitive Resonator for Power-Free LSI: Efficiency Analysis and Fundamental Experiment," *International Symposium on Low Power Electronics and Design, Proceedings of the* 2003 *International Symposium on Low Power Electronics and Design,* 193-198 (2003), which is incorporated herein by reference.

Figure 7:
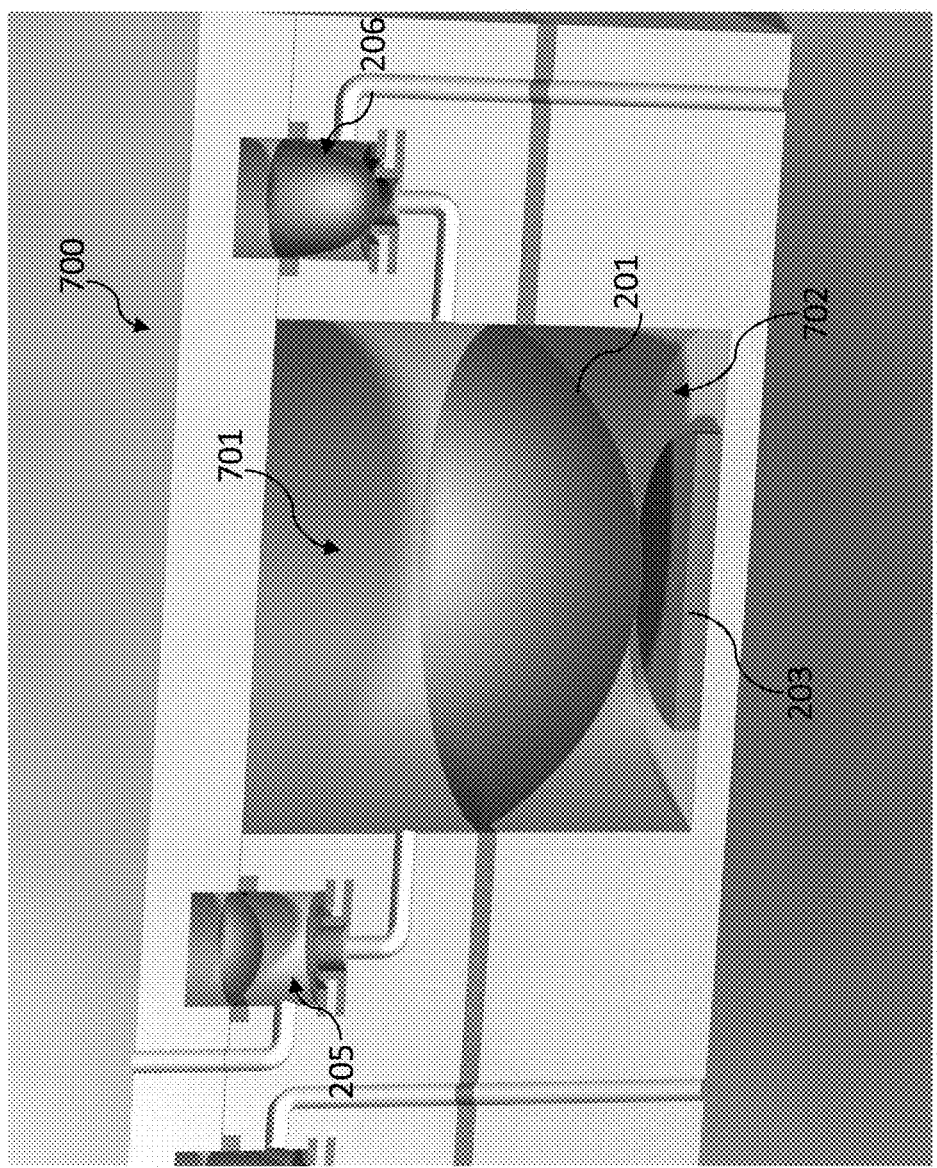
FIG. 7 depicts an alternative embodiment of a graphene-drum pump system.
Figure 8:
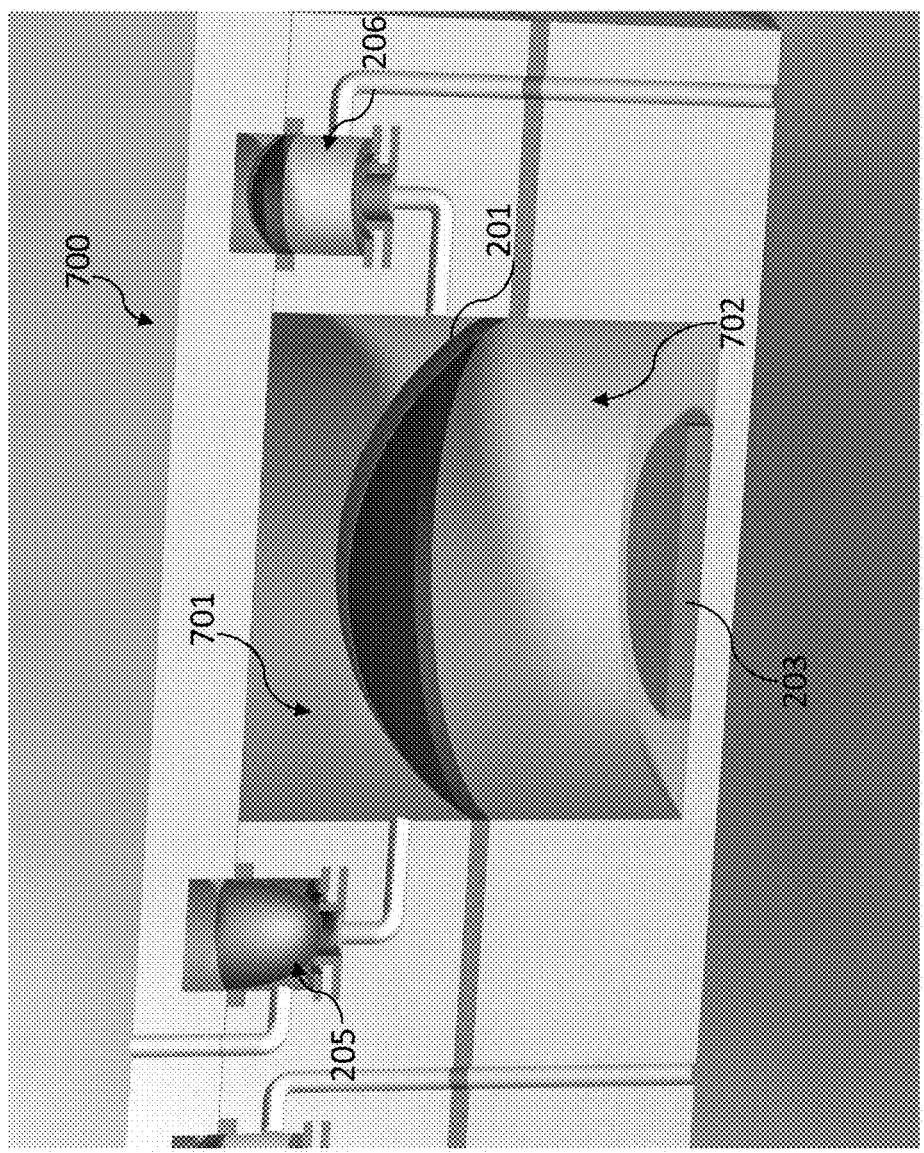
FIG. 8 depicts the graphene-drum pump system of FIG. 7 with the graphene drum in a different position.

In FIGS. 7-8, an alternate embodiment of the present invention is shown that locates the graphene drum 201 such that the cavity 202 (in FIG. 2) is separated into two sealed cavities. (The change of position of graphene drum 201 is shown in FIGS. 7-8). Per the orientation of FIGS. 7-8, graphene drum 201 seals an upper cavity 701 and a lower cavity 702. As shown in FIGS. 7-8, upstream valve 205 and the downstream valve 206 are positioned to allow the pumping of fluid in and out of upper cavity 701.

As depicted in FIGS. 7-8, lower cavity 702 is oriented between the graphene drum 201 and the gate 203. Lower cavity 702 can be evacuated to increase the breakdown voltage between the graphene drum 201 and the gate 203. The maximum force (and thus the maximum graphene drum displacement) between the graphene drum 201 and the gate 203 increases as the square of this voltage. Thus, the pumping speed of the device 700 will increase significantly with an increase in the maximum allowable voltage.

As noted above, upper cavity 701 can be filled with air or some other gas/fluid that is being pumped. The vacuum in the lower cavity 702 can be created prior to mounting the graphene drum 201 over the main opening and maintained with a chemical getter. Small channels (not shown) between the lower cavities 702 could be routed to an external vacuum pump to create and maintain the vacuum. A set of dedicated graphene drum pumps mounted in the plurality of graphene drum pumps could also be used to create and maintain vacuum in the lower chambers (since pumping volume is so low these dedicated graphene drum pumps could operate with air in their lower chambers).

Similar to other embodiments shown in this Application, in FIGS. 7-8, graphene drum 201 can act like a giant spring: i.e., once the gate 203 pulls graphene down (as shown in FIG. 7), when released the graphene drum 201 will spring upward (as shown in FIG. 8).

This same approach can also be used in internal combustion embodiments to increase the power density of the device.

Figure 9:
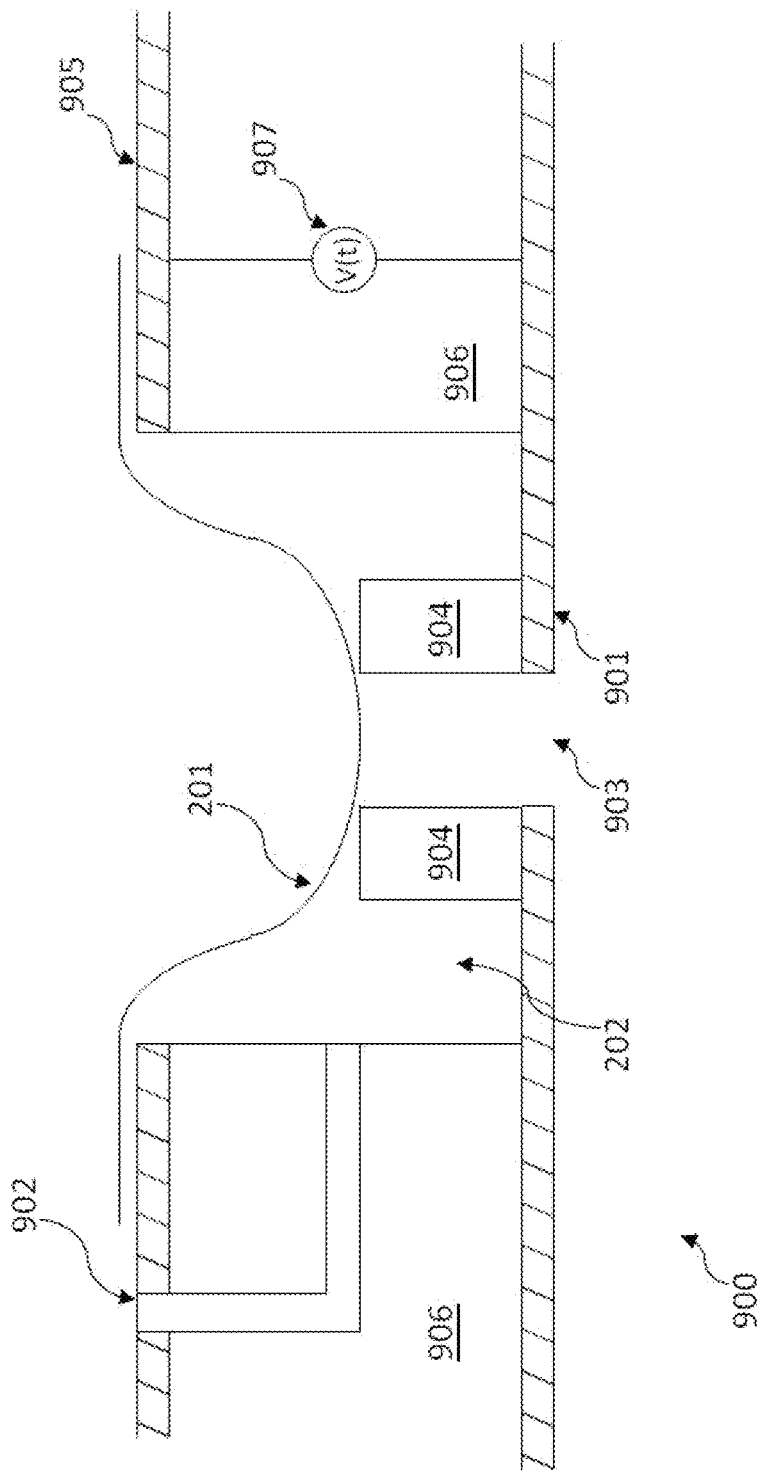
FIG. 9 depicts a further alternative embodiment of a graphene-drum pump system.

In FIG. 9, a further alternate embodiment of the present invention is shown. In The graphene-drum pump system 900 shown in FIG. 9 can be actuated without requiring feedback as described above with respect to FIG. 2. In this embodiment, non-conductive member 904 (such as oxide) is placed between the graphene drum 201 and metallic gate 901 so that the graphene drum 201 cannot go into runaway mode and so that graphene drum 201 will not vigorously impact metallic gate 901 when seating. In embodiments of the invention, setting the graphene drum 201 (non-deflected) to metallic gate 901 distance to 20% of the diameter of the graphene drum 201 will prevent runaway (for a maximum deflection that is in the order of 10% of diameter of the graphene drum 201) and will allow the graphene drum 201 to seat softly on a surface of the non-conductive member 904 (such as oxide) without the need for feedback.

As shown in FIG. 9, when the graphene drum 201 is an open position, fluid can flow either (a) in inlet/outlet 902, through cavity 202, and out outlet/inlet 903 or (b) in outlet/inlet 903, through cavity 202, and out inlet/outlet 902 (due to the pressure differential between inlet/outlet 902 and outlet/inlet 903).

As shown in FIG. 9, the metallic gate 901 and metallic trace 905 have a non-conductive member 904 (such as oxide) between them. A voltage source 907 can be placed between the metallic gate 901 and the metallic trace 905 operatively connected to the graphene drum 201. The non-conductive member 904 physically prevents the graphene drum 201 and the metallic gate 901 from coming in contact with one another. This would prevent potentially damaging impacts of the graphene drum 201 and metallic gate 901.

Figure 10:
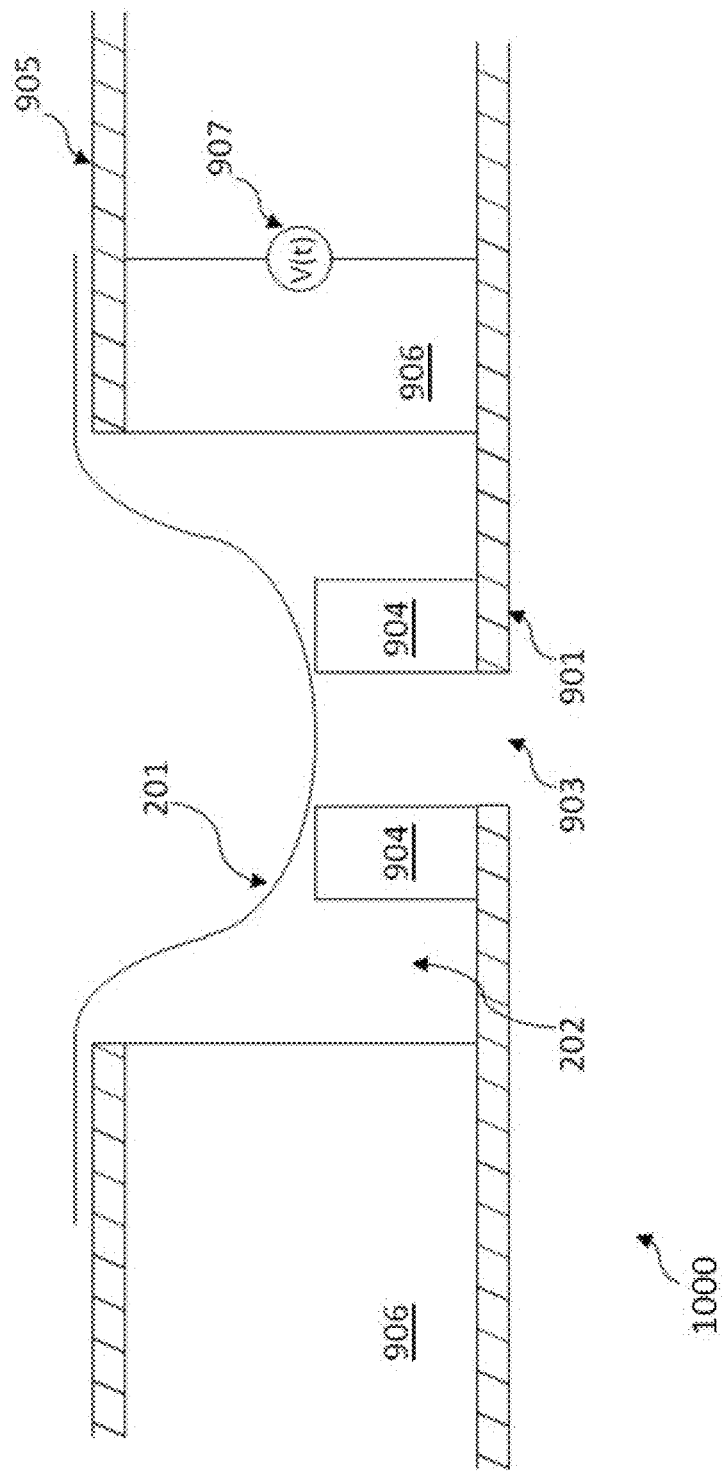
FIG. 10 depicts a further alternative embodiment of a graphene-drum pump system.

The graphene-drum pump system 1000 shown in FIG. 10 is similar to graphene-drum pump system 900 shown in FIG. 9, except that graphene-drum pump system does not include inlet/outlet 902. It has been discovered that such graphene-drum pump system 1000 is capable of efficiently transmitting information through the air via ultrasonic waves. Because graphene is so thin, an electroacoustic transducer with graphene membrane 201 can operate at 20 to 1000 kHz and respond very faithfully to input voltage 907. In addition, stator/gate voltages of just 1 to 10 volts (easily created by very compact CMOS circuits) can substantially deflect graphene membrane 201 whereas these voltages would be unable to substantially deflect conventional membranes such as silicon oxide membranes. If a second graphene-based electroacoustic transducer (such as graphene-drum pump system 1000) is placed within a few meters of the first graphene-drum pump system 1000, the second graphene-drum pump system 1000 will pick up this 20-1000 kHz signal as a microphone. Data such as a song file can be sent from one device incorporating graphene-drum pump 1000 (such as a smart-phone or smart-watch) to another device incorporating graphene-drum pump system 1000 (such as an earbud) without the need for a radio signal (such as a Bluetooth signal).

Figure 11:
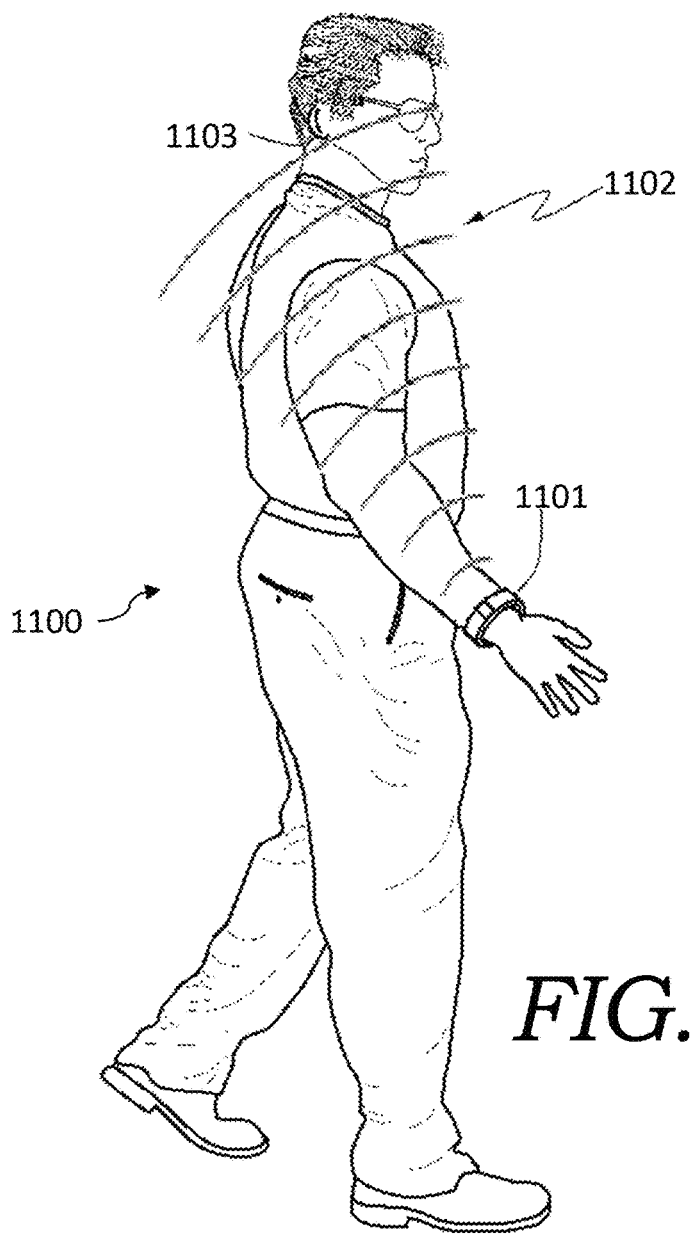
FIG. 11 is an illustration of two devices having graphene-drum pump systems (such as devices incorporating the systems shown in FIGS. 9-10) that have been paired for sending and receiving ultrasonic waves.

Such a pairing of devices is illustrated in FIG. 11. Person 1100 is shown having a smart-watch 1101 that includes a graphene-based electroacoustic transducer such graphene-drum pump system 1000. This smart-watch has access to song files (such as in its memory or by streaming of audio files, such as via WiFi or a cellular network). Using the graphene-based electroacoustic transducer 1000, the smart-watch 1101 can generate ultrasonic waves 1102. Such ultrasonic waves 1102 are outside the auditory range of humans and most animals and thus are imperceptible to the human ear. However, the ultrasonic waves 1102 are perceptible to earbuds 1103 that include graphene-drum pump system 1000. Earbuds 1103 would then emit sound waves from a small electroacoustic actuator (which may also use a graphene membrane) also located within earbud 1103 that are within the auditory range of humans, such that the sent audio file can be heard.

To increase the amount of information transferred from smart-watch 1101 (or other electronic device such as a smart-phone) to earbud 1103 multiple graphene-based ultrasonic transducers can be used. For example one graphene-based ultrasonic transducer 1000 can operate in a frequency modulation mode at a frequency of 200 kHz+/−2 kHz and another graphene-based ultrasonic transducer can operate at a frequency of 210 kHz+/−2 kHz.

Earbuds 1103 may also send ultrasonic signals back to smart-watch 1101 and the right earbud may send ultrasonic signals to the left earbud. For example body temperature and heart rate information can be conveyed from earbud 1103 to smart-watch 1101 via ultrasonic signals.

Various pairing techniques can be used so that only earbuds 1103 will reproduce sound from the ultrasonic waves 1102 from smart-watch 1101. For instance, a unique ultrasonic identification signal can be incorporated into ultrasonic waves 1102 that verifies to earbuds 1103 that the ultrasonic waves 1102 are being emitted from smart-watch 1101. These and other pairing techniques used by Bluetooth devices can thus screen out other potential ultrasonic waves (such as if another device emitting ultrasonic waves comes in close enough proximity to be received by earbuds 1103).

Advantages of this graphene-based electroacoustic transducer (relative to existing technologies such as Bluetooth) include extremely small size (each graphene-based ultrasonic transducer 1000 can have a sub-millimeter diameter) and extremely low power consumption (due in part to the low voltage operation noted above). Both of these attributes are very important for battery-based earbuds and smart-watches. The receiving end (the microphone) of a graphene-based ultrasonic transducer 1000 can actually harvest power from the transmitted ultrasonic wave by making use of time-dependent changes in capacitance between the membrane 201 and conductive trace 901 (this energy harvesting technique using other types of variable capacitors is well known in the art). This is a key function since the batteries of earbuds are extremely small and current devices using Bluetooth receivers can only be operated for at most a few hours before needing to recharge the batteries. This same technique can be used with hearing aids.

While not illustrated, in further embodiments of the invention, the graphene-drum pump system can be designed to prevent the graphene drum and metallic gate from coming in contact. For instance, the graphene drum could be located at a distance such that its stiffness that precludes the graphene drum from being deflected to the degree necessary for it to come in contact with metallic gate. In such instance, the graphene drum would still need to be located such that it can be in the open position and the closed position. Or, a second and stabilizing system can be included in the embodiment of the invention that is operable for preventing the graphene drum from coming in contact with the gate.

As noted above, embodiments of the present invention can be used as a pump to displace fluid. This includes the use of present invention in a speaker, such as a compact audio speaker. While the graphene drums in the present invention operate in the MHz range (i.e., at least about 1 MHz), the graphene drums can produce kHz audio signal by displacing air from one side and pushing it out the other (and then reversing the direction of the flow of fluid at the audio frequency). Advantages of utilizing such an approach include: (a) this will provide the ability to make very low and very high pitch sounds with the same and very compact speaker; (b) this will provide the ability to make high volume sounds with a very small/light speaker chip; and (c) this will provide a little graphene speaker that would cool itself with high velocity airflow.

Furthermore, the present invention can be utilized in other devices and systems to take advantageous of the small size and precise fluid flow of the graphene-drum pump. For instance, the small size and precise fluid flow of the graphene-drum pump renders it useful in medical applications (such as drug delivery, miniature heart pumps, etc.) and consumer electronics applications (such as tiny ink pumps, silent fans etc.).

A number of embodiments of the invention have been described. Nevertheless, it will be understood that various modifications may be made without departing from the spirit and scope of the invention. Accordingly, other embodiments are within the scope of the following claims.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, graphene-drum pumps and engines can be layered or stacked (for instance, vertically) to increase output. Also, the graphene drums can be shapes other than circles such as squares or rectangles (i.e., the use of the term "drums" does not limit the shape). Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A system comprising:
   (a) a first device comprising a first electrically conductive membrane pump system, wherein
      (i) the first electrically conductive membrane pump system comprises one or more first electrically conductive membranes, and
      (ii) the first electrically conductive membrane pump system is operable to transmit information through the air via ultrasonic waves;
   (b) a second device comprising a second electrically conductive membrane pump system, wherein
      (i) the second electrically conductive membrane pump system comprises one or more first electrically conductive membranes, and
      (ii) the second electrically conductive membrane pump system is operable to receive the information transmitted through the air via ultrasonic waves by the first device and is further operable to emit sound within the auditory range of humans that corresponds to the information transmitted.

2. The system of claim 1, wherein the one or more first electrically conductive membranes are one or more graphene membranes.

3. The system of claim 1, wherein the one or more second electrically conductive membranes are one or more graphene membranes.

4. The system of claim 1, wherein the ultrasonic waves have a frequency in a range between 20 KHz and 1000 kHz.

5. The system of claim 1, wherein the first electrically conductive membrane pump system further comprises:
   (a) a gate and a trace operatively connected to at least one of the one or more first electrically conductive membranes;
   (b) an input voltage source operatively connected to the gate and the trace, wherein the input voltage source is operable to control movement of the at least one of the first electrically conductive membranes to generate the ultrasonic waves.

6. The system of claim 1, wherein the first device is selected from the group consisting of a smart-phone or a smart-watch and the second device is an earbud.

7. The system of claim 1, wherein the first device is a smart-watch.

8. The system of claim 1, wherein the second device is an earbud.

9. The system of claim 1, wherein the second electrically conductive membrane pump system is operable to harvest power from the ultrasonic waves transmitted from the first device.

10. The system of claim 1, wherein the second device is a pair of earbuds.

11. The system of claim 1, wherein the information transmitted from the first device and received by the second device comprises information from an audio file.

12. The system of claim 1, wherein
   (a) the information transmitted from the first device and received by the second device comprises a first component and a second component,
   (b) the first component comprises information that corresponds to the sound emitted by the second device within the auditory range of humans, and
   (c) the second component pairs the first device and the second device such that the second device is informed from the second component to allow the sound corresponding to the first component to be emitted.

13. A device that comprises an electrically conductive membrane pump, wherein the electrically conductive membrane pump comprises:
   (i) a cavity having an electrically conductive membrane, wherein
      (a) the electrically conductive membrane is operable to change the volume capacity of the cavity,
      (a) the electrically conductive membrane comprises a polymer coated with a conductive coating, and
      (b) the conductive coating has a conductivity in the range of ten thousand ohms/cm2 to one billion ohms/cm2;
   (ii) a gate and a trace operatively connected to the electrically conductive membrane; and
   (iii) an input voltage source operatively connected to the gate and the trace, wherein the input voltage source is operable to control movement of the electrically conductive membrane to change the volume capacity of the cavity.

14. The device of claim 13, wherein the polymer film comprises polyethylene terephthalate.

15. The device of claim 13, wherein the conductive coating is formed from the deposition of an antistatic fluid on the polymer.

16. The device of claim 13, wherein the conductive coating is less than 5 nm in thickness.

17. The device of claim 13, wherein the conductive coating comprises a metal.

18. The device of claim 17, wherein the conductive coating is less than 5 nm in thickness.

19. The device of claim 17, wherein the conductive coating is formed from the deposition of the metal using vapor deposition.

20. The device of claim 13, wherein the device is operable as a speaker.

21. The device of claim 13, wherein the device is operable as a compact audio speaker.

22. The device of claim 21, wherein the electrically conductive membrane is operable for producing an audio signal having a frequency in the audio frequency range.

23. The device of claim 13, wherein the device is operable for medical applications.

24. The device of claim 13, wherein the device is operable for electronic applications.

25. A device that comprises an electrically conductive membrane pump, wherein the electrically conductive membrane pump comprises:
- (i) a cavity having an electrically conductive membrane, wherein the diaphragm is operable to change the volume capacity of the cavity;
- (ii) a first valve connected to the cavity, wherein
  - (a) the first valve is operable to be in an open position, wherein fluid can flow (I) through the first valve into the cavity and (II) from the cavity through the first valve, depending upon the pressure differential across the first valve, and
  - (b) the first valve is operable to be in a closed position, wherein fluid cannot flow (I) through the first valve into the cavity and (II) from the cavity through the first valve, regardless of the pressure differential across the first valve; and
- (iii) a second valve connected to the cavity, wherein
  - (a) the second valve is operable to be in an open position, wherein fluid can flow (I) through the second valve into the cavity and (II) from the cavity through the second valve, depending upon the pressure differential across the second valve, and
  - (b) the second valve is operable to be in a closed position, wherein fluid cannot flow (I) through the second valve into the cavity and (II) from the cavity through the second valve, regardless of the pressure differential across the second valve; wherein
    - (I) at least one of the cavity, first valve, or second valve comprises an electrically conductive membrane,
    - (II) the electrically conductive membrane comprises a polymer coated with a conductive coating, and
    - (III) the conductive coating has a conductivity in the range of ten thousand ohms/cm2 to one billion ohms/cm2.

* * * * *